United States Patent Office
3,416,950
Patented Dec. 17, 1968

3,416,950
METHOD OF IMPROVING THE BONDING CHARACTERISTICS OF GLASS SURFACES
Malcolm E. Schrader, Brooklyn, N.Y., assignor to the United States of America as represented by the Secretary of the Navy
No Drawing. Filed Mar. 30, 1965, Ser. No. 444,086
3 Claims. (Cl. 117—106)

ABSTRACT OF THE DISCLOSURE

Glass fibers are modified to improve their bonding characteristics for resinous materials. Glass fibers are treated with organophosphorous compounds, such as triethyl phosphate and tricresyl phosphate, which react with the silanol groups on the glass fiber surface to form a surface compound of the type Si—O—P.

---

The invention described herein may be manufactured and used by or for the Government of the United States of America for governmental purposes without the payment of any royalties thereon or therefor.

One of the main uses for glass fibers has been in the production of glass reinforced plastics but the surfaces of glass fibers are not suitable for the formation of a strong bond between organic resinous materials and glass fibers. Also, any bonding which can be developed with an unfinished glass surface will be adversely affected by the formation of a water film on the glass surface upon exposure to high humidity or moisture conditions. In order to obtain an effective bonding relationship between the resinous materials and the surfaces of the glass strands or fibers it is necesary to develop the chemical forces on the glass fibers.

It is known that glass fibers which are finished with certain types of chemicals may be used to produce reinforced plastic laminates of substantially greater strength than laminates produced with unfinished glass fibers. While the strength of the laminates, under normal or so called dry conditions is increased by the finish, improvement is also observed in the increased wet strength of these laminates. All successful finishes for this purpose are of the type known as coupling agents or chemical compounds which have molecules containing certain functional groups which are capable of forming a chemical bond with the glass surface and also containing functional groups which are capable of forming a chemical bond with the resin.

An explanation for the action of chemical finishes in protecting the reinforced plastics against deterioration in strength from water permeation is believed to be for the reasons that hydroxyl groups are present on glass surfaces as silanol groups, $Si_s$—OH, in which the subscript $s$ denotes a surface atom and that the silanol groups are known to adsorb water molecules. This water adsorption is probably through hydrogen bond formation and water molecules thus adsorbed will in turn adsorb more water molecules, through hydrogen bond formation. Consequently, the surface silanol groups act as centers, or active sites, for the formation of layers of adsorbed water which under conditions of high humidity, for example, can build up to a thickness of layers to a degree where they have the properties of bulk water which will rapidly react with the glass surface. By treating the glass surfaces with chemical compounds which are capable of reacting with the silanol groups on the glass surfaces to form hydrolysis-resistant chemical bonds, the adsorption of water molecules by the silanol group sites can be prevented.

The broad object of the present invention is to react organophosphorus compounds with the silanol, $Si_s$—OH groups of the glass surfaces to produce a topochemical or surface compound containing an $Si_s$—O—P linkage.

Another object of this invention is to react organophosphorus compounds with the silanol, $Si_s$—OH groups of glass fibers to produce a glass surface finish having the formula

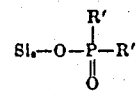

Another object of the invention is to react organophosphorus compounds with the silanol, $Si_s$—OH groups of glass fibers to produce a finish having the formula

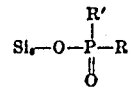

in which the group R represents a radical or functional group which is active with respect to or couples to the particular plastic of which the laminates are formed and the group R' represents a radical or functional group which is active with respect to the glass fibers.

Another object is directed to the method of finishing glass fibers by reacting their surface $Si_s$—OH groups with organophosphorus compounds to produce silicon oxygen phosphorus linkages and prevent the adsorption of water thereon.

Other objects, advantages and novel features of the invention will become apparent from the following general description and examples of the invention.

The compounds suitable for reacting with the glass surfaces within the purview of this invention are the phosphate and phosphonic esters and the reaction of the compounds with the $Si_s$—OH of the glass surfaces may be represented by the general formula

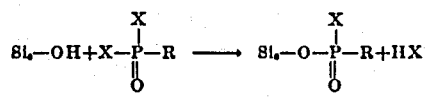

wherein the X group is an alkoxy or aroxy series, such as ethoxy. In the formula, the R group is a short organic chain or free radical and contains a radical or functional group which is capable of chemically bonding with the resin.

Typical of the phosphate and phosphonic ester compounds which may be used in the reaction with the glass surface $Si_s$—OH are the following:

Triethyl phosphate ____ Diethyl butyl phosphonate
Diethyl phosphate ____ Diethyl propyl phosphonate
Tributyl phosphate ____ Diethyl allyl phosphonate
Tricresyl phosphate ___ Diethyl gamma-amino propyl phosphonate
Diethyl gamma-dimethyl amino propyl phosphonate Example 1

Glass fibers are vacuum baked, preferably in a vacuum of $10^{-5}$ torr or better, at a temperature between 100° C. to 500° C., and preferably in the range of 200° C. to 450° C., for between 1 to 12 hours, and preferably in the range of 2 to 6 hours. The fibers are then exposed to triethyl phosphate vapor at any pressure up to its room temperature equilibrium pressure or about 600 microns torr preferably at its room temperature equilibrium pressure, for at least 1 minute and preferably for about 10 minutes. The glass fibers are then heated in a vacuum, preferably $10^{-5}$ torr, for 1 to 6 hours at temperatures upwardly of 350° C. and preferably in the range of 150° C. to 200° C.

Example 2

A solution of tricresyl phosphate in benzene, or other solvent such as toluene or xylene, having a preferable concentration in the range $10^{-4}$ to $10^{-1}$ molar is prepared and the baked glass fibers of example 1 are immersed in the solution for not more than 10 minutes and preferably in the range of 2 to 5 minutes. The fibers are then allowed to dry in air, after which they are heated at a temperature in the range 100° C. to 200° C. for a period of time upwardly of 4 hours and preferably in the range 1 hour to 2 hours.

Example 3

A solution of triethyl phosphate and water, having a concentration in the range $10^{-4}$ to $10^{-1}$ molar, is prepared. The baked glass fibers are immersed in the solution and then treated generally according to the procedure set out in Example 2 for the tricresyl phosphate.

The laminates are preferably formed by treating the glass fibers before they are arranged in sheet layers and after formation of the layers they are impregnated with the resinous material and the mass is then subjected to heat and pressure to form a compact unitary structure.

As pointed out heretofore the general formula of the reaction of the organophosphorus compounds with the $Si_s$—OH glass surface group is written as

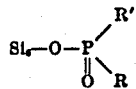

where $Si_s$ is a surface silicon atom, and R and R' are respectively a radical which is active with respect to the particular resin and a radical which is active with respect to the glass fibers. It is to be understood that the presence of the "double bonded" oxygen (=O) is not necessary to the formation or function of the surface compound. For example, the surface compound may contain trivalent phosphorus which is formed from the reaction of the surface $Si_s$—OH with a trivalent phosphorus compound in which case it would be represented at

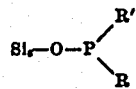

When the phosphorus is pentavalent, the surface compound may contain "double bonded" oxygen, or may contain one or two other atoms, double or single bonded, respectively, to satisfy the two remaining valence bonds. The significant part of the surface compound is the $Si_s$—O—P linkage.

Obviously many modifications and variations of the present invention are possible in the light of the above teachings. It is therefore to be understood that, within the scope of the appended claims, the invention may be practiced otherwise than as specifically described.

I claim:
1. The method of providing a finish for glass fiber surfaces to improve their bonding characteristics for resinous material which comprises,
  (a) heating the glass fibers in a high vacuum at upwardly of 500° C.,
  (b) maintaining the vacuum for approximately 12 hours and
  (c) saturating the heated fibers with a compound selected from the group consisting of triethyl phosphate and tricresyl phosphate esters to produce a surface compound of the type $Si_s$—O—P.
2. The method of providing a finish for glass fiber surfaces to improve their bonding characteristics for resinous material which comprises,
  (a) baking the glass fibers at a temperature between 100° C. and 500° C. for a period of 1 to 12 hours,
  (b) exposing the glass fibers to triethyl phosphate vapors for upwardly of 10 minutes then,
  (c) heating the glass fibers at a temperature upwardly of 350° for a period of 1 to 6 hours to permit the vapors to react with the silanol $Si_s$—OH groups on the glass surface to produce a surface compound of the type $Si_s$—O—P.
3. The method of providing a finish for glass fiber surfaces to improve their bonding characteristics for resinous material which comprises,
  (a) heating the glass fibers at a temperature between 100° C. and 500° C. for a period of 1 to 12 hours,
  (b) immersing the fibers in a solution of tricresyl phosphate for upwardly of 10 minutes then,
  (c) heating the glass fibers at a temperature between 100° C. and 200° C. for a period upwardly of 4 hours to permit the tricresyl phosphate to react with the silanol $Si_s$—OH on the glass surface to produce a surface compound of the type $Si_s$—O—P.

References Cited

UNITED STATES PATENTS

| | | | |
|---|---|---|---|
| 2,742,378 | 4/1956 | Grotenhuis | 117—126 XR |
| 2,776,910 | 1/1957 | Erickson et al. | 117—126 XR |
| 3,002,857 | 10/1961 | Stalego | 106—74 XR |
| 3,337,391 | 8/1967 | Clayton et al. | 117—124 XR |

RALPH S. KENDALL, *Primary Examiner.*

W. F. CYRON, *Assistant Examiner.*

U.S. Cl. X.R.

117—118, 126, 72